US012754118B2

(12) United States Patent
Sakuramoto et al.

(10) Patent No.: US 12,754,118 B2
(45) Date of Patent: Oct. 6, 2026

(54) PARTICLE ANALYSIS DEVICE

(71) Applicant: HORIBA, Ltd., Kyoto (JP)

(72) Inventors: Keijiro Sakuramoto, Kyoto (JP); Tetsuya Mori, Kyoto (JP)

(73) Assignee: HORIBA, LTD., Kyoto (JP)

( * ) Notice: Subject to any disclaimer, the term of this patent is extended or adjusted under 35 U.S.C. 154(b) by 210 days.

(21) Appl. No.: 18/702,425

(22) PCT Filed: Jan. 17, 2023

(86) PCT No.: PCT/JP2023/001141
§ 371 (c)(1),
(2) Date: Apr. 18, 2024

(87) PCT Pub. No.: WO2023/140244
PCT Pub. Date: Jul. 27, 2023

(65) Prior Publication Data
US 2025/0258080 A1 Aug. 14, 2025

(30) Foreign Application Priority Data
Jan. 21, 2022 (JP) ................................ 2022-007799

(51) Int. Cl.
*G01N 15/0205* (2024.01)

(52) U.S. Cl.
CPC . *G01N 15/0211* (2013.01); *G01N 2015/0216* (2013.01); *G01N 2015/0222* (2013.01)

(58) Field of Classification Search
CPC ............... G01N 2015/0222; G01N 2015/0216
See application file for complete search history.

(56) References Cited

U.S. PATENT DOCUMENTS 3,989,381 A * 11/1976 Fulwyler ............ G01N 15/1436 356/338
4,421,860 A * 12/1983 Elings ................ G01N 21/6428 356/417
(Continued)

FOREIGN PATENT DOCUMENTS

CN 101726452 A 6/2010
FR 2653885 B1 1/1994
(Continued)

OTHER PUBLICATIONS

Translation of KR 102310367 B1 (Year: 2021).*
(Continued)

*Primary Examiner* — Rufus L Phillips
(74) *Attorney, Agent, or Firm* — LUCAS & MERCANTI, LLP

(57) ABSTRACT

In order to enable a device to be installed in a limited space on the periphery of a line and to keep a path for transportation of a sample from the line short, the present invention is configured so as to comprise a flow cell through which a sample including particles flows, a light source for radiating light to the particles in the flow cell, a photodetector for detecting secondary light from the particles, and a computation circuit for detecting an autocorrelation function from a light intensity signal outputted from the photodetector and analyzing the autocorrelation function or the particles included in the sample, an optical system unit including the flow cell and the light source, and a control unit including the photodetector and the computation circuit being separate from each other and connected via a light guiding member for guiding the secondary light to the photodetector.

8 Claims, 5 Drawing Sheets

(56) References Cited

U.S. PATENT DOCUMENTS

| | | | | | |
|---|---|---|---|---|---|
| 4,752,131 | A * | 6/1988 | Eisenlauer | G01N 15/1459 356/442 |
| 5,138,181 | A | 8/1992 | Lefevre et al. | |
| 5,202,953 | A * | 4/1993 | Taguchi | G10L 19/06 704/E19.024 |
| 10,955,327 | B2 * | 3/2021 | Trainer | G01N 15/0205 |
| 11,199,486 | B2 * | 12/2021 | Corbett | G01N 15/0211 |
| 2001/0019516 | A1 * | 9/2001 | Wake | G01S 3/8083 367/127 |
| 2004/0080750 | A1 * | 4/2004 | Wolf | G01J 3/457 356/417 |
| 2007/0291254 | A1 * | 12/2007 | Wolf | G01J 3/4406 356/417 |
| 2009/0161107 | A1 | 6/2009 | Nerin et al. | |
| 2010/0141940 | A1 * | 6/2010 | Caro | G01N 15/1459 356/301 |
| 2012/0242992 | A1 * | 9/2012 | Schulte | G01N 21/31 356/432 |
| 2014/0368820 | A1 * | 12/2014 | Sugasawa | G01N 15/0211 356/336 |
| 2015/0056710 | A1 * | 2/2015 | Reed | G01N 21/51 702/22 |
| 2016/0143628 | A1 * | 5/2016 | Kikuchi | A61B 8/54 600/440 |
| 2017/0307495 | A1 * | 10/2017 | Corbett | G01N 15/0211 |
| 2019/0335995 | A1 | 11/2019 | Dhadwal | |
| 2021/0063296 | A1 * | 3/2021 | Aubrit | G01N 21/51 |
| 2021/0270711 | A1 * | 9/2021 | Martins | G01N 15/0255 |

FOREIGN PATENT DOCUMENTS

| | | | | |
|---|---|---|---|---|
| JP | 2002-022644 | A | 1/2002 | |
| JP | 2005-534944 | A | 11/2005 | |
| JP | 2010-078469 | A | 4/2010 | |
| JP | 2013-167589 | A | 8/2013 | |
| JP | 2020-155573 | A | 9/2020 | |
| KR | 102310367 | B1 * | 10/2021 | G01N 15/06 |
| TW | 201333188 | A | 8/2013 | |
| WO | WO-02061405 | A2 * | 8/2002 | G01N 21/645 |
| WO | 2004/013620 | A1 | 2/2004 | |

OTHER PUBLICATIONS

Extended European search report, dated Sep. 15, 2025, which was issued for the European patent application No. 23743238.0, 8 pages.

International Search Report dated Apr. 4, 2023, for the corresponding International patent application No. PCT/JP2023/001141, with English translation (5 pages).

Office Action, dated Mar. 25, 2026, which was issued for the corresponding Taiwanese patent application No. 112101950, 15 pages, with English translation.

* cited by examiner

PARTICLE ANALYSIS DEVICE

CROSS REFERENCE TO RELATED APPLICATION

This Application is a 371 of PCT/JP2023/001141 filed on Jan. 17, 2023, which, in turn, claims priority of Japanese Patent Application No. 2022-007799 filed on Jan. 21, 2022, and the above applications are incorporated herein by reference.

TECHNICAL FIELD

This invention relates to a particle analysis device.

BACKGROUND TECHNOLOGY

Slurry particles are sometimes used for polishing semiconductors in a semiconductor manufacturing process, and if too large particles are contained in the slurry particles, they may damage the semiconductors. Therefore, there are some cases that particle analysis devices that use in-line or on-line dynamic scattering methods to measure particle size distribution are used (Patent document 1).

However, environment around the line in which particles flow varies depending on a manufacturing site, and there may be a case that an installation space of the device is limited. A conventional particle analysis device, in which a flow cell, a light source, a photodetector, and other components are integrally housed in a single case, is bulky in size, and if the device does not fit the installation space, it requires that a shape of the line be changed.

It is a matter of course if the particle analysis device is installed in a wide area away from the line and samples are transported from the line to that area, it is possible to conduct analysis without changing the shape of the line. However, in this case, the line to transport the sample becomes long so that other problems, such as increased sample loss, changes in sample properties, and decreased responsiveness, would occur.

PRIOR ART REFERENCES

Patent document 1: Japanese Unexamined Patent Application Publication No. 2002-22644

SUMMARY OF THE INVENTION

Problem to be Solved by the Invention

The present claimed invention is made to solve the above-mentioned problems, and its main subject is to make it possible for the particle analysis device to be installed in a limited space around the line and to keep a route for transporting the sample from the line short.

Means to Solve the Problems

More specifically a particle analysis device in accordance with this invention comprises a flow cell through which a sample containing particles flows, a light source that irradiates light to the particles in the flow cell, a photodetector that detects secondary light from the particles, and an arithmetic circuit that calculates an autocorrelation function from a light intensity signal output by the photodetector and analyzes the particles contained in the sample using the autocorrelation function, and is characterized by that an optical system unit including the flow cell and the light source, and a control unit including the photodetector and the arithmetic circuit are separately provided from each other and are connected through a light guide member that guides the secondary light to the photodetector.

In accordance with the particle analysis device having the above configuration, since the optical system unit and the control unit are separately provided from each other, and the photodetector is arranged on the control unit side, the optical system unit becomes much more downsized compared with a conventional device as a whole.

As a result of this, even if the space around the line where particles flow at a manufacturing site is limited, analysis becomes possible as long as the optical system unit can be installed in the installation space, and as a result of this, a route for transporting the sample from the line can be kept short, which in turn minimizes sample loss, sample degeneration, and response degradation as much as possible.

In order to secure an accuracy of analyzing particles by the dynamic scattering method, it is not enough to acquire only the intensity of the scattered light, but also its phase information is necessary. In other words, it is necessary to guide photons emitted from the particle by light irradiation to the photodetector in the same order in which the photons emerge. Therefore, if the optical system unit and the control unit are connected by, for example, a rather thick optical fiber, the phase information will be lost due to the thick optical fiber, resulting in a problem that the measurement accuracy cannot be secured.

Therefore, in order to secure the measurement accuracy by the dynamic scattering method, it is preferable that the light guide member guides the secondary light emitted from the particles to the photodetector without losing phase information of the secondary light. In other words, it is best that the core diameter of the light guide member is single-mode for the light emitted from the light source.

However, since it is difficult for the single-mode optical fiber to obtain sufficient intensity of the scattered light because the core diameter is extremely small, it is preferable that the light guide member is an optical fiber having a core diameter of up to 20 times that a single-mode core diameter.

On the other hand, if the optical system unit and the control unit are connected by a thin optical fiber as described above, the positioning of the incident side end part of the optical fiber becomes severe in order to secure the intensity of the scattered light to be detected.

Therefore, it is preferable that the particle analysis device further comprises a connection portion that is placed between the light guide member and the optical system unit and that connects the light guide member and the optical system unit, and the connection portion is operated from outside the optical system unit.

In accordance with such a configuration, the position of the incident side end part of the optical fiber can be easily adjusted even after the particle analysis device is installed in a site where in-line or on-line analysis can be conducted.

To explain the above-mentioned positioning more concretely, in case that the light from the light source is irradiated horizontally to the flow cell, the scattered light should be strong at the same height position as that of the light. If the incident end side part of the optical fiber is displaced vertically from this height, the intensity of the detected scattered light will drop significantly.

Therefore, it is preferable that the connection portion is configured to allow adjusting a position of the incident side end part of the light guide member in a direction orthogonal to the irradiation direction of the light from the light source to the flow cell.

In accordance with this configuration, for example, if the light from the light source is emitted in a horizontal direction, it is possible to adjust a position of the incident side end part of the light guide member in a vertical direction orthogonal to the horizontal direction so that the intensity of the scattered light to be detected can be secured.

It is preferable that the optical system unit comprises a heat dissipating member placed between the light source and a casing constituting the optical system unit.

In accordance with this configuration, a cooling structure using, for example, a Peltier element is not necessary so that the optical system unit can be further downsized.

In addition, since a cooling fan is not required, it is also possible to prevent dust and dirt from entering the optical system unit from outside.

It is preferable that the optical system unit comprises a mirror that reflects transmitted light that is emitted from the light source and that is transmitted through the flow cell, and a low reflectance member to which the transmitted light reflected by the mirror is irradiated.

In accordance with this configuration, it is possible to absorb the transmitted light by the low reflectance member so that stray light can be prevented from entering into the light guide member such as the optical fiber.

It is preferable that the optical system unit comprises one or more light reducing filters that reduce the light from the light source and a motor that drives the one or more light reducing filters, and the control unit comprises a control circuit that controls the motor.

In accordance with this configuration, it is possible to further downsize the optical system unit by arranging the control circuit for the motor on the control unit side.

Effects of the Invention

In accordance with this configuration, it is possible to downsize the optical system unit and to keep a short route for transporting the samples from the line by arranging the optical system unit in a limited space around the line through which particles flow, thereby reducing sample loss, sample denaturation, and response degradation as much as possible.

BEST MODE FOR EMBODYING THE INVENTION

One embodiment of a-particle analysis device of the present claimed invention will be explained with reference to drawings.

The particle analysis device of this embodiment is used together with a manufacturing system, such as, for example, a semiconductor manufacturing system, used for a prescribed manufacturing process and performs in-line or online measurement on particle size distribution of particles used in the manufacturing system.

An example of the particles as an object to be measured can be represented by, for example, polishing slurries such as CMP slurries.

The particle analysis device measures particle size distribution using a dynamic light scattering (DLS) method and is capable of measuring the particle size distribution in a range that includes, for example, a nanoscale particle diameter area.

Figure 1:
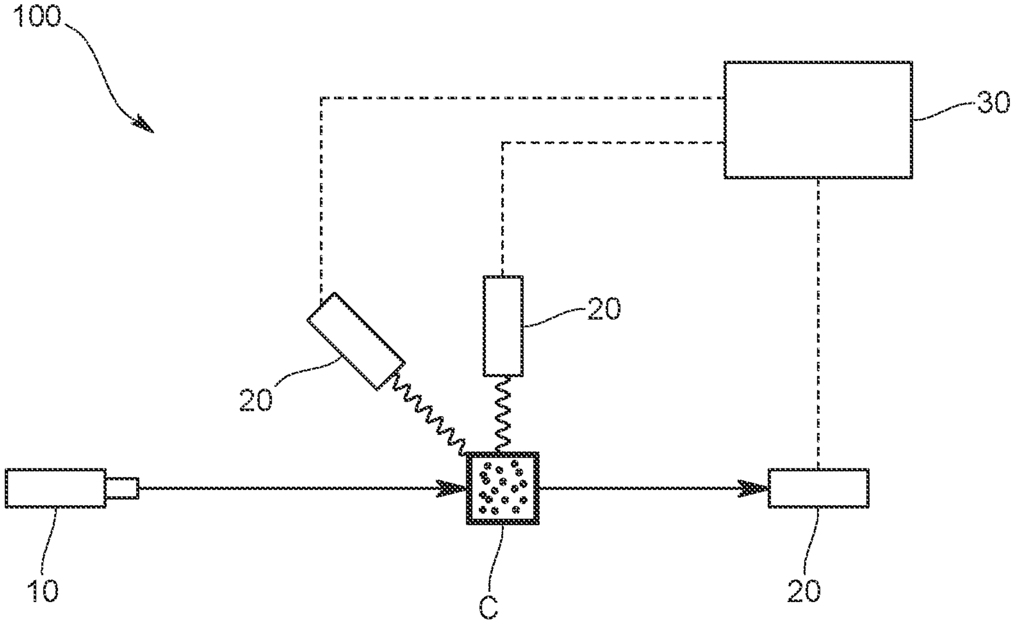
FIG. 1 A schematic diagram showing an overall configuration of a particle analysis device of one embodiment.

If explaining a configuration of the particle analysis device 100 schematically, as shown in FIG. 1, the particle analysis device 100 comprises a flow cell (C) through which a sample containing particles flows, a light source 10 that irradiates light to the particles in the flow cell (C), one or more photodetectors 20 that detect secondary light from the particles, and an arithmetic circuit 30 that calculates the particle size distribution based on fluctuations in the light intensity signal output from the photodetectors 20.

Figure 2:
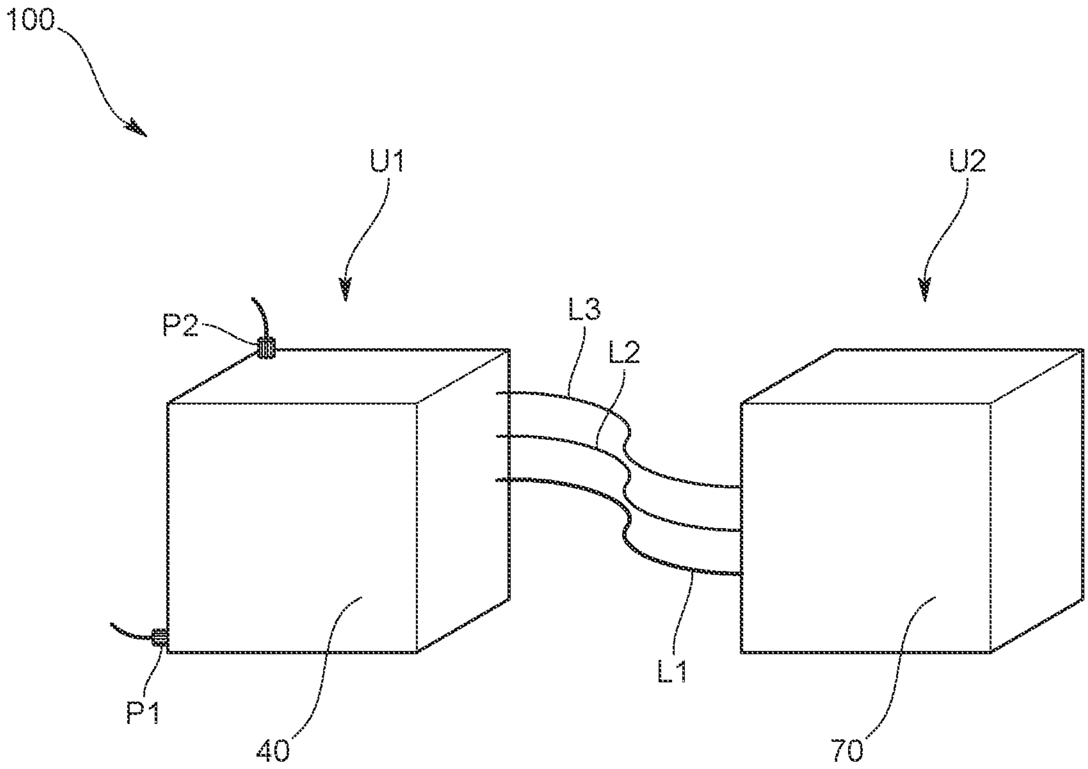
FIG. 2 A schematic diagram showing an optical system unit and a control unit of this embodiment.

As shown in FIG. 2, the particle analysis device 100 comprises an optical system unit U1 and a control unit U2, which are separately provided from each other, and these units U1 and U2 are connected through a light guide member L1 that guides the above-mentioned secondary light.

The optical system unit U1 and the control unit U2 in this embodiment are connected also through a power supply cable L2 and an IO line L3 as well as the light guide member L1.

First, the optical system unit U1 will be explained.

Figure 3:
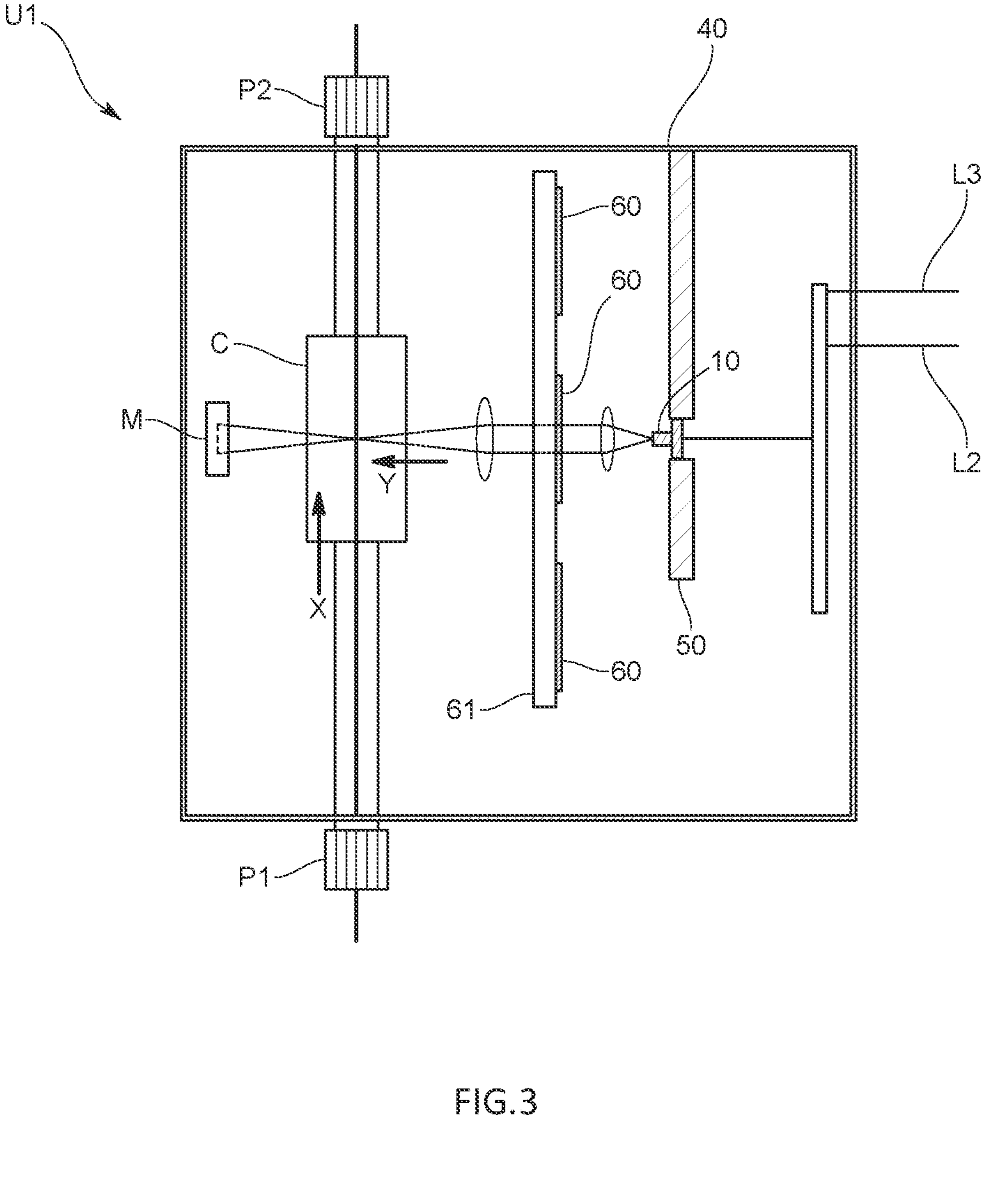
FIG. 3 A schematic diagram showing an internal structure of the optical system unit of this embodiment.
Figure 4:
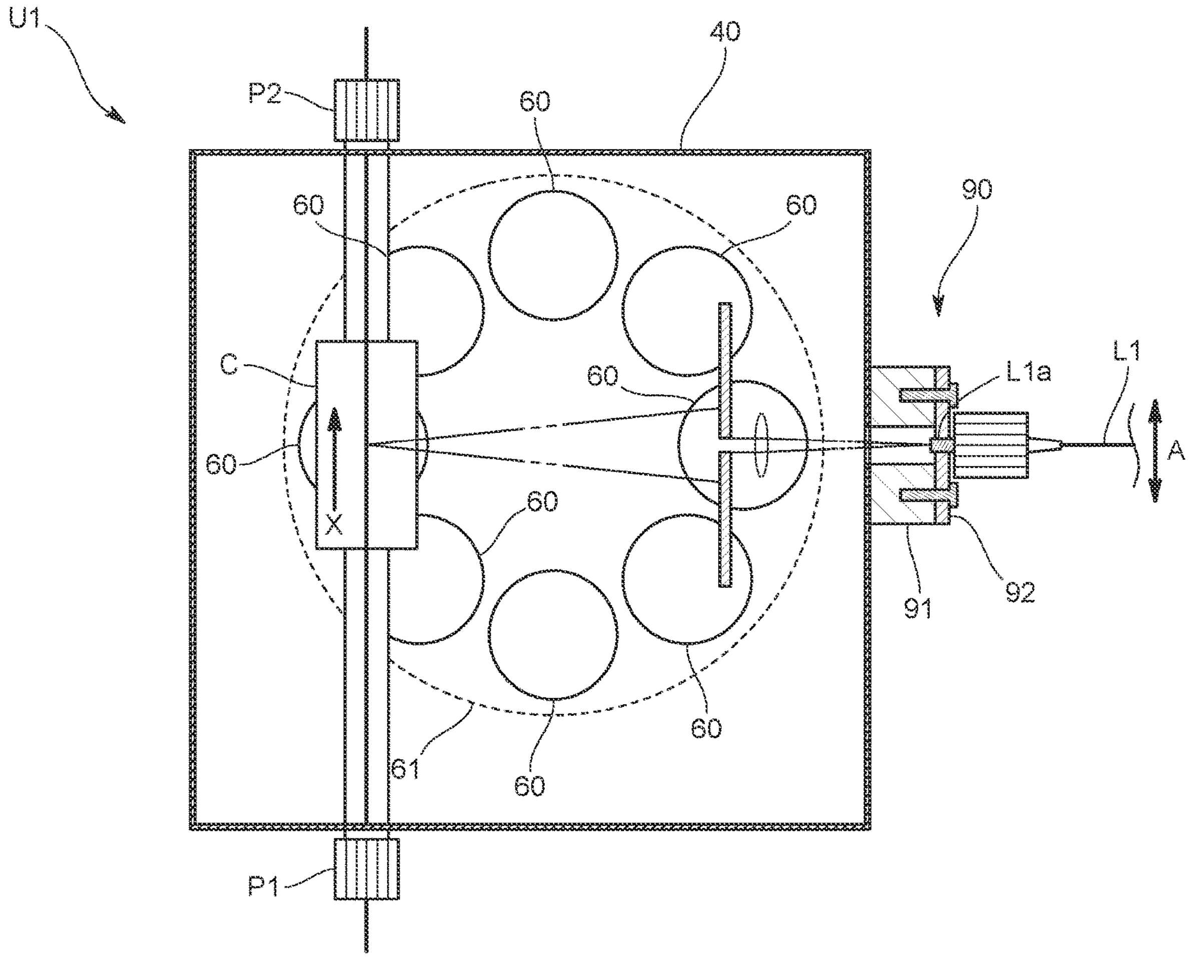
FIG. 4 A schematic diagram showing the internal structure of the optical system unit of this embodiment.

As shown in FIG. 3 and FIG. 4, the optical system unit U1 is connected to a piping constituting the above-mentioned manufacturing system and the sample containing the particles is guided from the piping and comprises at least the above-mentioned flow cell (C) and the light source 10.

The flow cell (C) and the light source 10 are, as shown in FIG. 2, housed in a first casing 40 in which a sample introduction port P1 and a sample derivation port P2 are formed.

The flow cell (C) and the light source 10 in this embodiment are arranged, as shown in FIG. 3, so that a flow direction (X) of the sample containing the particles flowing through the flow cell (C) is orthogonal to an irradiation direction (Y) (namely, a direction along an optical axis of the light passing through the flow cell (C)) of the light from the light source 10 to the flow cell (C).

The light source 10 is, for example, a laser light source that emits a laser beam and the light source 10 is held by a holding member 50 made of a metal such as aluminum.

The holding member 50 locates between the light source 10 and the first casing 40 and is thermally connected thereto and functions as a heat dissipating member that transfers heat from the light source 10 to the first casing 40.

As shown in FIG. 3 and FIG. 4, the optical system unit U1 of this embodiment comprises a plurality of light reduction filters 60 that reduce light from the light source 10 and a motor (not shown in drawings) that drives a plurality of the light reduction filters 60 so as to be able to selectively set the light reduction filter 60 through which the light from the light source 10 passes among a plurality of the light reduction filters 60.

More concretely explained, a plurality of the light reduction filters 60 are held by a common retainer 61 placed between the light source 10 and the flow cell (C) and are mounted on the retainer 61 at a plurality of locations on, for example, a circumference of the retainer 61.

The motor is a stepping motor that, for example, rotates and drives the above-mentioned retainer 61 and is so configured that the light reduction filter 60 to be placed between the light source 10 and the flow cell (C) is selectively determined by controlling a rotational angle of the motor.

Furthermore, the optical system unit U1 in this embodiment comprises a mirror (M) that reflects the transmitted light emitted from the light source 10 and transmitting through the flow cell (C) and a low reflectance member (not shown in drawings) to which the transmitted light reflected by the mirror (M) is irradiated. For example, a black material can be used as the low reflectance member, and as an example of the low reflectance member, flock paper can be used. A part, whose reflectance is low, of a member constituting the optical system unit U1, may be used as the low reflectance member without using flock paper.

Next, a control unit U2 will be explained.

Figure 5:
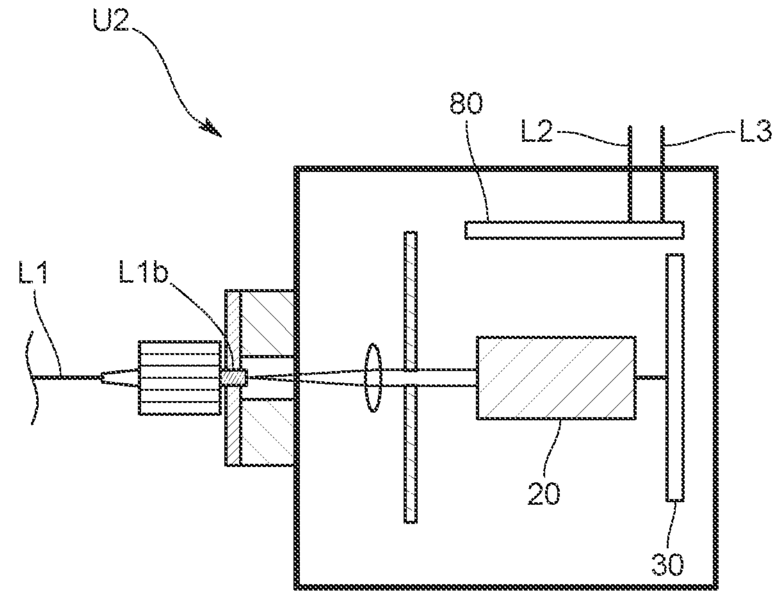
FIG. 5 A schematic diagram showing an internal structure of the control unit of this embodiment.

As shown in FIG. 2, the control unit U2 is placed at a position distant from the above-mentioned optical system unit U1 and, as shown in FIG. 5, comprises at least the above-mentioned photodetector 20 and the arithmetic circuit 30.

The photodetector 20 and the arithmetic circuit 30 are housed in a second casing 70 that is different from the above-mentioned first casing 40 and are connected through connection wiring.

The photodetector 20 detects the scattered light from the particles and outputs a light intensity signal indicating the scattered light intensity to the arithmetic circuit 30. Concretely, the photodetector 20 makes use of a photomultiplier tube that can detect microscopic light.

The arithmetic circuit 30 comprises an FPGA, a CPUs, a memory, an AD converter and a DA converter, and calculates an autocorrelation function from the light intensity signal output by the photodetector 20 and calculates the particle size distribution of the particles contained in the sample from the autocorrelation function by cooperatively working each of the devices and by executing the program stored in the memory.

The arithmetic circuit 30 is not necessarily limited to calculating the particle size distribution, however, the arithmetic circuit 30 may analyze various characteristics of the particles such as calculating, for example, gel characteristics like an average lattice spacing of gel from the autocorrelation function.

The control unit U2 of this embodiment further comprises a control circuit 80 that controls the above-mentioned motor, as shown in FIG. 5. The control circuit 80 receives an input selection signal indicating the light reduction filter 60 selected by a user through an input means and controls the rotational angle of the motor based on the input selection signal.

Next, a light guide member L1 that connects the above-mentioned optical system unit U1 and the above-mentioned control unit U2, and its peripheral structures will be explained.

The light guide member L1 is so configured that an incident side end part L1*a* through which the light enters is connected to the optical system unit U1 and an emission side end part L1*b* through which the light is emitted is connected to the control unit U2, as shown in FIG. 2, and the scattered light generated from the particles in the flow cell (C) is received by the incident side end part L1*a* and then the scattered light is transmitted to the emission side end part L1*b* and injected into the photodetector 20. The light guide member L1 is concretely an optical fiber.

The optical fiber as being the light guide member L1 guides photons the as being the scattered light generated from the particles to the photodetector 20 without losing or almost losing its phase information. Concretely, the light guide member L1 has a core diameter ranging from a core diameter to be single-mode for the laser beam emitted from the light source 10 to a core diameter of up to 20 times that diameter.

As shown in FIG. 4, the particle analysis device 100 of this embodiment further comprises a connection portion 90 that is placed between the light guide member L1 and the optical system unit U1 and that connects the light guide member L1 and the optical system unit U1.

This connection portion 90 is mounted on the first casing 40 and supports the incident side end part L1*a* of the light guide member L1, and the incident side end part L1*a* of the light guide member L1 is supported in a manner of being able to adjust the position of the incident side end part L1*a*.

If explained in more detail, the connection part 90 is configured to make it possible to adjust the position of the light guide member L1 in a direction (A) orthogonal to an irradiation direction (Y) of the light from the light source 10 to the flow cell (C) by being operated from outside the optical system unit U1.

Concretely, the connection portion 90 has a fixing portion 91 that is fixed to the first casing 40, and a support portion 92 that is mounted on the fixing portion 91 by means of screws or the like to enable relative movement to the fixing portion 91 and that also supports the incident side end portion L1*a* of the light guide member L1.

With this configuration, the position of the incident side end portion L1*a* of the light guide member L1 is adjusted by positioning the holding portion relative to the fixing portion 91. In this embodiment, the position of the incident side end portion L1*a* of the light guide member L1 is configured to be able to be adjusted along a flow direction (X) of the sample in the flow cell (C).

In accordance with the particle analysis device 100 having the above-mentioned configuration, the optical system unit U1 and the control unit U2 are arranged separately from each other, and since the photodetector 20 is arranged in the control unit U2, the optical system unit U1 is much more downsized compared with an entire conventional device.

In accordance with this configuration, even in case that the space around the line in which the particles flow at the manufacturing site is limited, it becomes possible to conduct analysis as long as the optical system unit U1 can be installed in the installation space. As a result of this, it is possible to keep the path for transporting the sample from the line to the particle analysis device 100 short, thereby to suppress deterioration in sample loss, sample denaturation, and response degradation as much as possible.

In addition, since the control circuit 80 of the motor that drives the light reduction filter 60 is housed in the control unit U2, it is possible to further downside the optical system unit U1.

Furthermore, since the light guide member L1 is the optical fiber having the core diameter ranging from the core diameter to be single-mode for the light emitted from the light source 10 to the core diameter up to 20 times that diameter, in other words, the light guide member L1 is an extremely thin optical fiber, it is possible to guide the photons as being the scattered light emitted from the particles to the photodetector 20 without losing or almost without losing its phase information so that the measurement accuracy can be secured.

On the other hand, if a thin optical fiber is used as mentioned above, the incident side end part L1*a* of the optical fiber also becomes minute. Then, positioning the incident side end part L1*a* of the optical fiber becomes a very difficult and delicate work in order to secure the intensity of the scattered light detected by the photodetector 20.

In contrast, since the connection portion 90 of this embodiment is configured so that the incident side end part L1*a* of the light guide member L1 can be adjusted to position along the direction (A) orthogonal to the irradiation direction (Y) of the light source 10 to the flow cell (C), and concretely along the flow direction (X) of the sample in the flow cell (C), it becomes possible to secure the intensity of the scattered light to be detected.

In addition, since the holding member 50 that holds the light source 10 is placed between the light source 10 and the first casing 40 and functions as a heat-dissipating member that transfers heat of the light source 10 to the holding member 50, a cooling structure using, for example, a Peltier element can be made unnecessary so that the optical system unit U1 can be further downsized. This can eliminate the need for a cooling fan and prevent dust and dirt from entering the optical system unit U1 from the outside.

Furthermore, since the transmitted light that is emitted from the light source 10 and transmitted through the flow cell (C) is reflected by the mirror (M) toward a low reflectance member, the transmitted light can be absorbed by the low reflectance member and stray light can be prevented from entering the optical fiber.

The present invention is not limited to the above-mentioned embodiment.

For example, the flow cell (C) and the light source 10 are housed in the first casing 40 in the above-mentioned embodiment, however, they are not necessarily be housed in a casing and may be mounted on, for example, a surface plate.

In addition, the photodetector 20 and the arithmetic circuit 30 are also housed in the second casing 70 in the above-mentioned embodiment, however, they are not necessarily be housed in a casing and may be mounted on, for example, a surface plate. Furthermore, the photodetector 20 and the arithmetic circuit 30 do not necessarily need to be integrally provided, however, may be, for example, housed in separate casings or mounted on separate surface plates.

Furthermore, the connection portion 90 may be configured so that the incident side end L1*a* of the light guide member L1 can be adjusted to position not only in the flow direction (X) of the sample in the flow cell (C), but also, for example, in the light irradiation direction (Y), in the direction of advancing or retracting with respect to the first casing 40, or at an angle different from the previously mentioned directions.

In addition, the dimension of the optical fiber described in the above-mentioned embodiment is one mode of the light guide member L1, and an optical fiber with a diameter larger than the diameter described in the above-mentioned embodiment may be used as the light guide member L1.

Furthermore, the optical system unit U1 of the above-mentioned embodiment has a configuration in which the light reduction ratio can be changed in stages using a plurality of the light reduction filters 60, however, instead of a plurality of the light reduction filters 60, a single light reduction filter that continuously changes the light reduction ratio by being rotated may be used.

It is a matter of course that the present invention is not limited to the above-mentioned embodiments, and various modifications are possible without departing from a spirit of this invention.

Possible Applications in Industry

In accordance with the present invention, it becomes possible to install the particle analysis device in a limited space around the line and to keep a route for transporting the samples from the line short.

EXPLANATION OF CODES

100 . . . particle analysis device
C . . . flow cell
U1 . . . optical system unit
U2 . . . control unit
L1 . . . light guide member
10 . . . light source
20 . . . photodetector
30 . . . arithmetic circuit
40 . . . first casing
50 . . . holding member
60 . . . light reduction filter
70 . . . second casing
80 . . . control circuit
90 . . . connection portion
M . . . mirror

The invention claimed is:

1. A particle analysis device comprising
a flow cell through which a sample containing particles flows,
a light source that irradiates light to the particles in the flow cell,
a photodetector that detects secondary light from the particles,
an arithmetic circuit that calculates an autocorrelation function from a light intensity signal output by the photodetector and analyzes the particles contained in the sample using the autocorrelation function,
an optical system unit including a casing that houses the flow cell and the light source,
a control unit provided separately from the optical system unit and including the photodetector and the arithmetic circuit, wherein the photodetector and the arithmetic circuit of the control unit are arranged outside of the casing of the optical system unit and are connected to the optical system unit through a light guide member that guides the secondary light from casing of the optical system unit to the photodetector, and
a connection portion that is placed between the light guide member and the optical system unit and that connects the light guide member and the optical system unit, the connection portion being configured to allow adjusting a position of an incident side end part of the light guide member relative to the flow cell.

2. The particle analysis device described in claim 1, wherein
the light guide member guides the secondary light emitted from the particles to the photodetector without losing phase information of the secondary light.

3. The particle analysis device described in claim 1, wherein
the light guide member is an optical fiber having a core diameter ranging from a core diameter to be single-mode for the light emitted from the light source to a core diameter of up to 20 times that diameter.

4. The particle analysis device described in claim 1, wherein the connection portion is operated from outside the optical system unit.

5. The particle analysis device described in claim 1, wherein the optical system unit comprises a heat dissipating member placed between the light source and a casing constituting the optical system unit.

6. The particle analysis device described in claim 1, wherein the optical system unit comprises a mirror that reflects transmitted light that is emitted from the light source and that is transmitted through the flow cell, and a low reflectance member to which the transmitted light reflected by the mirror is irradiated.

7. The particle analysis device described in claim 1, wherein the optical system unit comprises one or more light reducing filters that reduce the light from the light source and a motor that drives the one or more light reducing filters, and the control unit comprises a control circuit that controls the motor.

8. The particle analysis device described in claim 1, wherein the casing of the optical system unit includes a sample introduction port and a sample derivation port for connection to a sample line.

* * * * *